United States Patent [19]
Alexander et al.

[11] 3,834,478
[45] Sept. 10, 1974

[54] PIVOTAL GUARD FOR A VEHICLE

[75] Inventors: George F. Alexander; Frank J. Helmig, both of Pekin; Eldon D. Oestmann, Washington; Ellis A. Sitton, East Peoria, all of Ill.

[73] Assignee: Caterpillar Tractor Co., Peoria, Ill.

[22] Filed: Mar. 28, 1973

[21] Appl. No.: 345,568

[52] U.S. Cl. ............................. 180/68 P, 165/77
[51] Int. Cl. ............................................ B60k 11/04
[58] Field of Search ............. 180/68 P, 68 R, 54 A; 123/41.43, 41.33; 165/51, 77, 149

[56] References Cited
UNITED STATES PATENTS

| | | | |
|---|---|---|---|
| 1,840,417 | 1/1932 | Seelert | 180/68 R |
| 2,095,058 | 10/1937 | Gross | 180/68 R |
| 2,100,490 | 11/1937 | Rippingille | 180/68 R |
| 2,912,057 | 11/1959 | Wagner | 180/68 R |
| 2,962,107 | 11/1960 | Mihal | 180/68 R |
| 2,965,187 | 12/1960 | Zeman | 180/69 R |
| 3,297,080 | 1/1967 | Williams et al. | 165/77 |
| 3,334,704 | 8/1967 | Gehrke et al. | 180/68 R |
| 3,727,712 | 4/1973 | Colloton | 180/68 R |

Primary Examiner—David Schonberg
Assistant Examiner—David M. Mitchell
Attorney, Agent, or Firm—Ralph E. Walters

[57] ABSTRACT

A pivotal guard for a vehicle having a main frame with a heat generating power unit supported thereon and a heat exchanger operatively associated with the power unit including a generally upstanding frame disposed in spaced shielding relation to the power unit and being pivotally connected to the vehicle main frame with the heat exchanger removably secured in the upstanding frame so that the guard and the heat exchanger may be swung as a unit away from the power unit to provide service access thereto.

17 Claims, 11 Drawing Figures

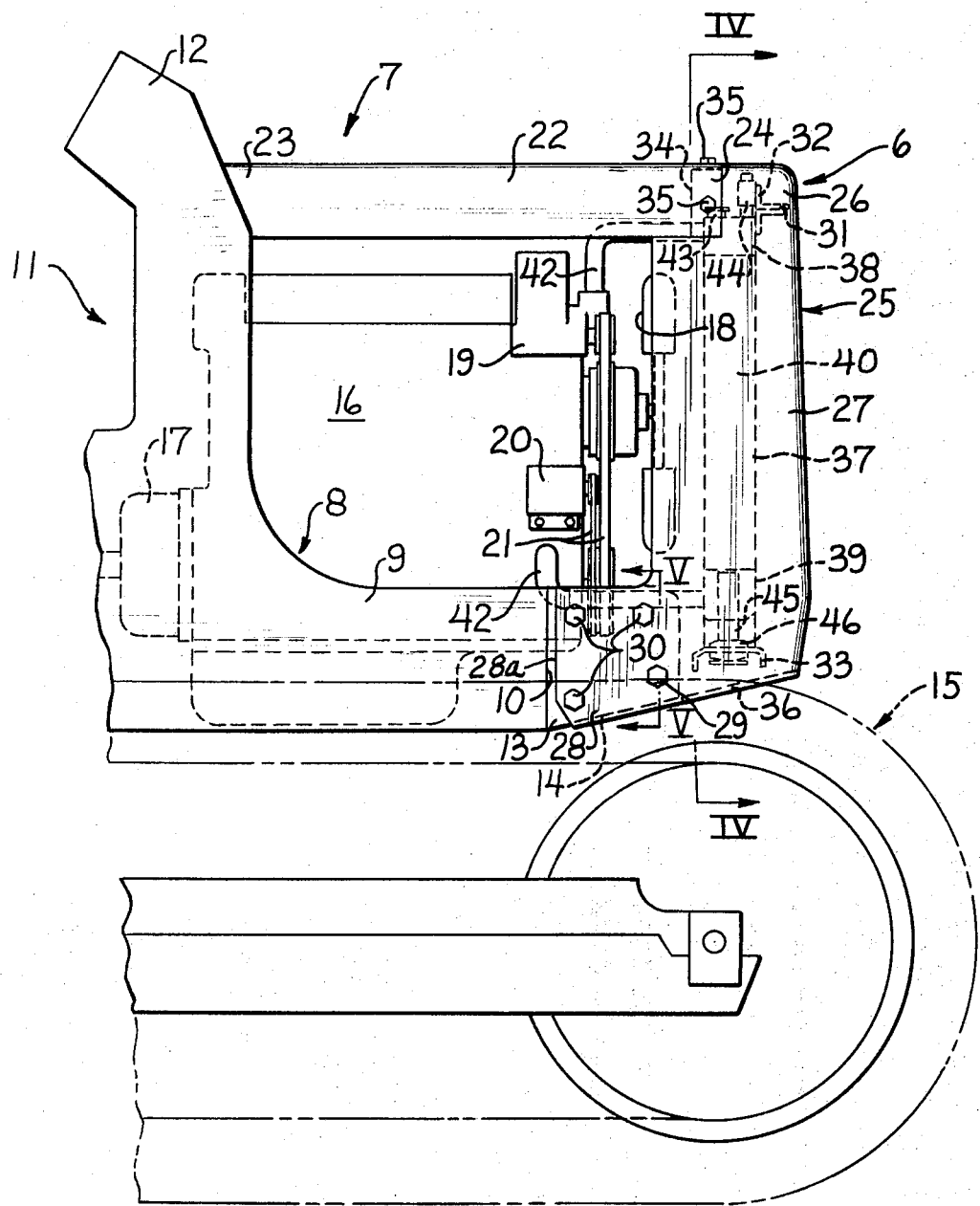

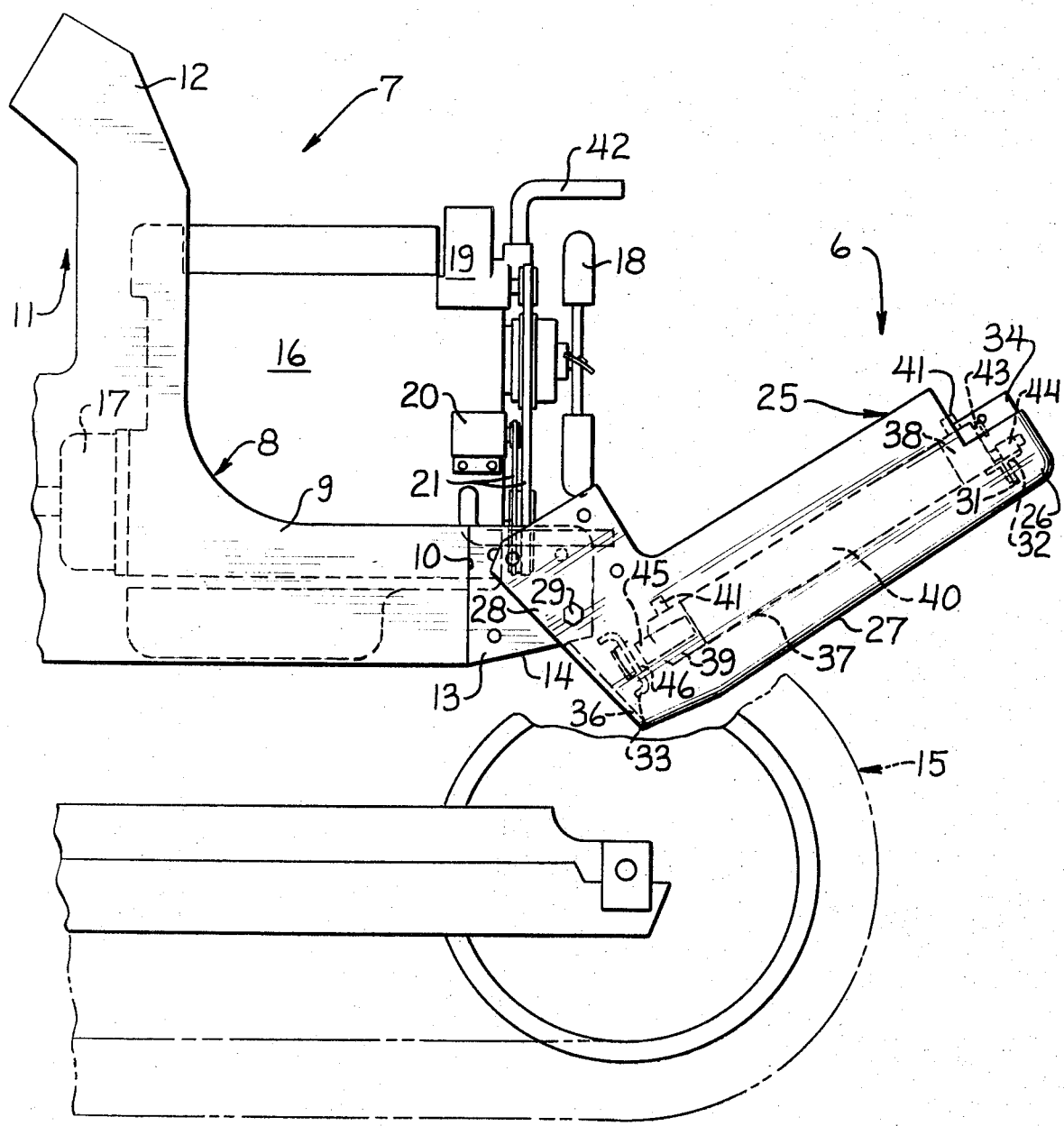

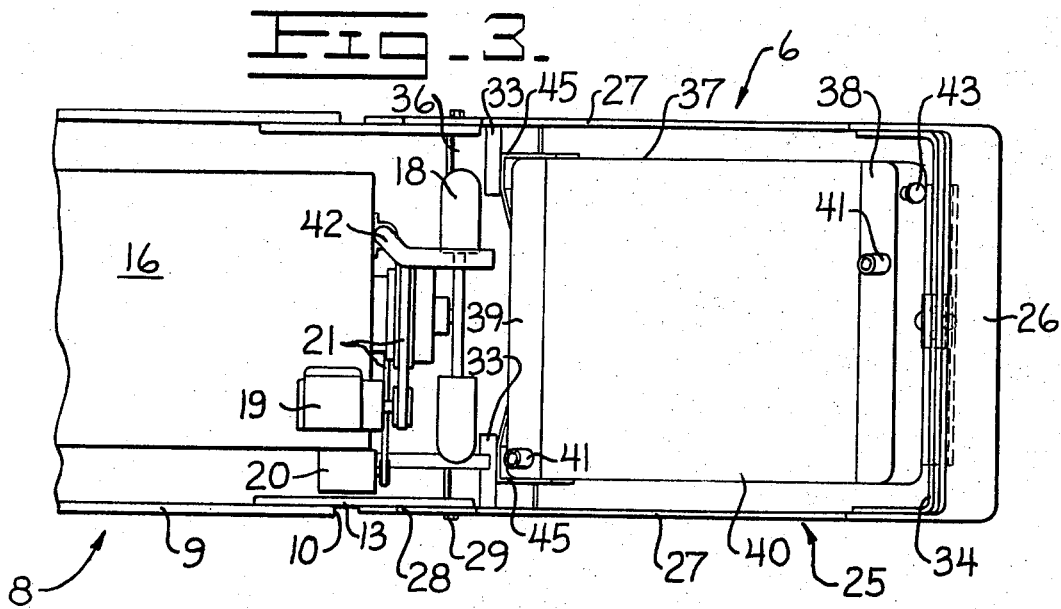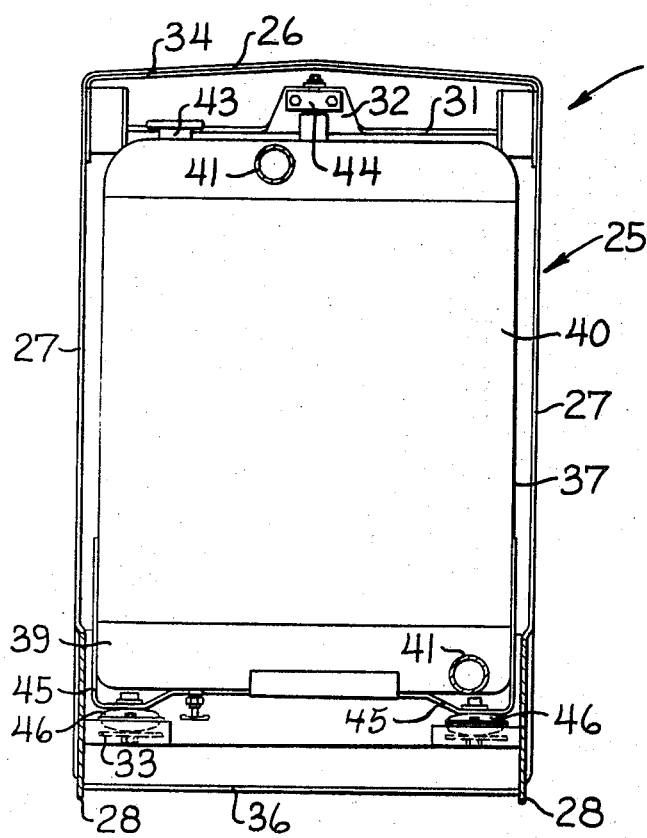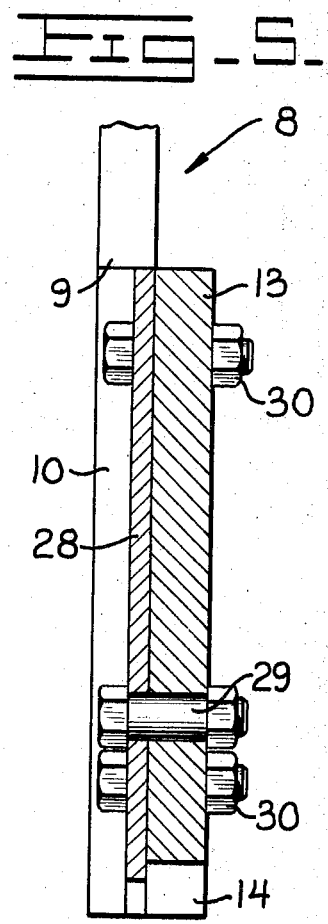

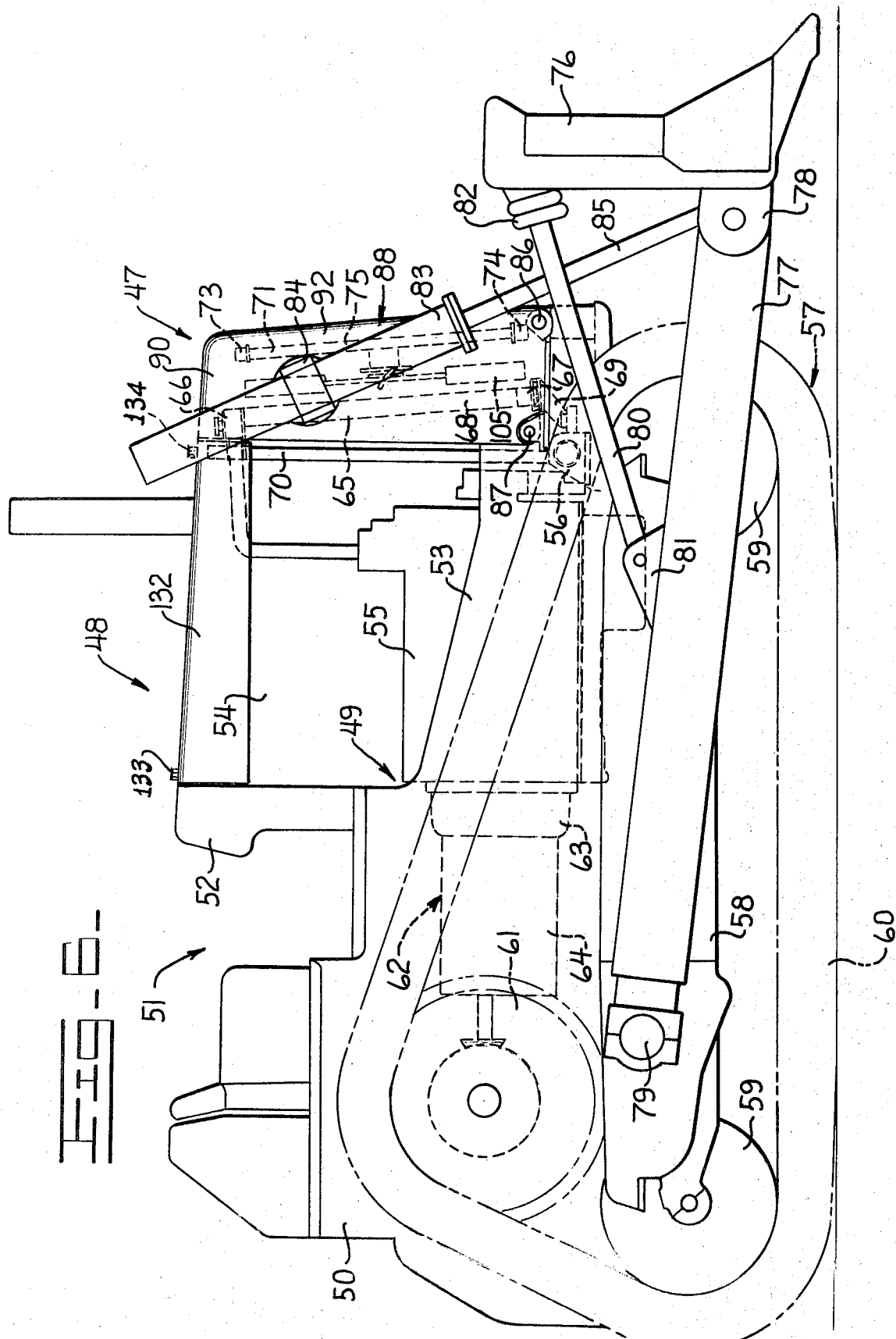

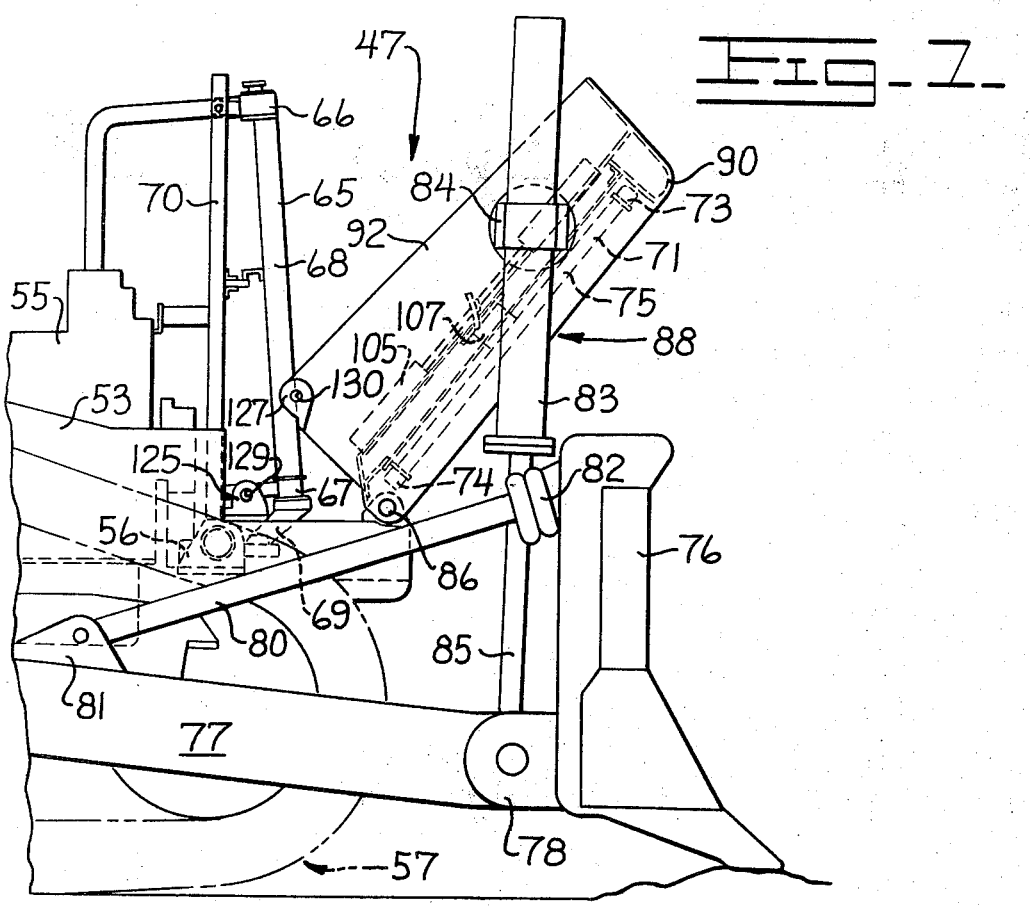
Fig_7_
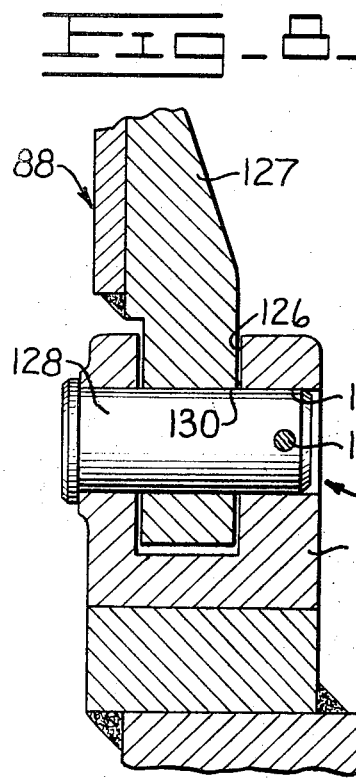
Fig_8_
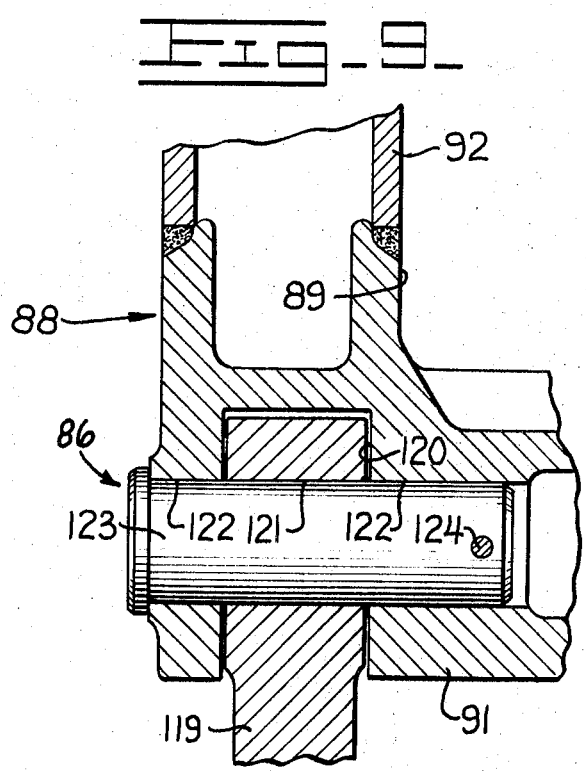
Fig_9_

PIVOTAL GUARD FOR A VEHICLE

BACKGROUND OF THE INVENTION

In heavy duty construction vehicles it is necessary to provide a relatively heavy guard member at the front end of the vehicle frame to protect the power unit components such as the engine and heat exchanger or radiator from damage. As a result, these guards obstruct access to the forward portion of the engine and to the radiator making service thereof difficult and time-consuming. The weight of these structural guard members prohibits complete removal, particularly in field service installations, and, consequently, discourages field servicing of any components located in the forward portion of the engine compartment.

Previous attempts to solve this problem are disclosed in H. H. Bidwell U.S. Pat. No. 2,921,392 and B. L. Zeman U.S. Pat. No. 2,965,187 wherein the engine guard structure is tiltably mounted to the vehicle frame in an effort to provide access to the power train and radiator for servicing. In these structures the radiator is supported on the vehicle main frame such that when the guard is tilted the radiator remains in an obstructing position which hinders or prevents access to certain portions of the engine or components mounted thereon. As a result, after tilting the guard away from the power unit compartment, it is still necessary to remove the radiator or heat exchanger with the result that excessive down time can result with a consequent loss in production and profitable operation of the vehicle. This problem is aggravated by the provision of several heat exchangers as is required in most large sizes of tractors.

SUMMARY AND OBJECTS OF THIS INVENTION

Accordingly, it is an object of this invention to provide an improved pivotal guard for a power unit which will simplify servicing of the power unit components located adjacent thereto.

Another object of this invention is to provide such an improved pivotal guard which permits servicing of the power unit components located adjacent the guard without requiring complete removal of such components from the vehicle.

Another object of this invention is to provide an improved pivotal guard of the character described which minimizes down time required for servicing of certain power unit components and the heat exchanger associated therewith by removably mounting the heat exchanger in the guard for tilting movement therewith.

Other objects and advantages of the present invention will become more readily apparent upon reference to the accompanying drawings and following description.

BRIEF DESCRIPTION OF THE DRAWINGS

FIG. 1 is a side elevational view of the forward portion of a crawler tractor incorporating an improved pivotal guard embodying the principles of the present invention.

FIG. 2 is a side elevational view similar to FIG. 1 with the guard pivoted forwardly to a position providing access to the power unit.

FIG. 3 is a top plan view of the structure illustrated in FIG. 2.

FIG. 4 is a transverse vertical sectional view taken generally along the line IV—IV of FIG. 1.

FIG. 5 is a fragmentary transverse vertical sectional view taken generally along the line V—V of FIG. 1.

FIG. 6 is a side elevational view of a crawler tractor incorporating an alternate embodiment of the present invention.

FIG. 7 is a side elevational view of the forward portion of the crawler tractor of FIG. 6 with the guard mounted thereon tilted forwardly to a position providing access to the forward portion of the power train compartment.

FIG. 8 is a fragmentary transverse vertical sectional view of a releasable connection of the guard to the tractor main frame.

FIG. 9 is a fragmentary transverse vertical sectional view of a pivotal connection of the guard to the tractor main frame.

DESCRIPTION OF THE PREFERRED EMBODIMENT

Figure 11:
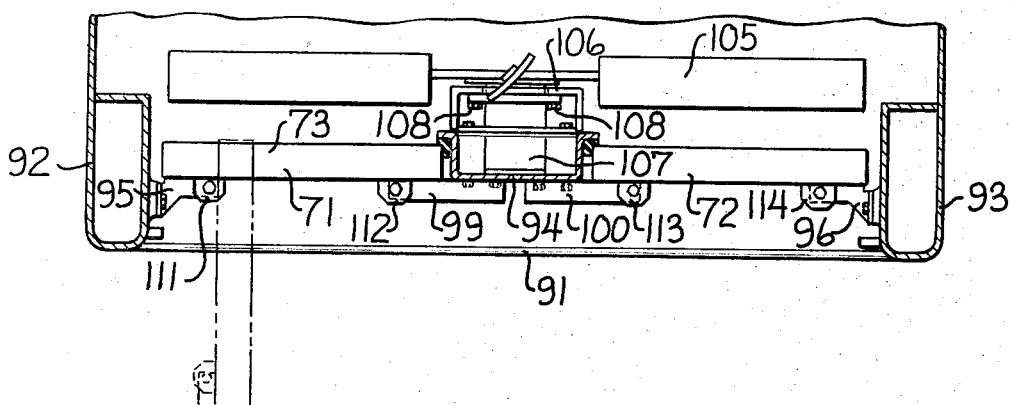
FIG. 11 is a fragmentary longitudinal horizontal sectional view taken generally along the line XI—XI of FIG. 10.

Referring more particularly to the drawings, a pivotal guard embodying the principles of the present invention is generally indicated by the reference numeral 6 as operatively mounted on a track-type vehicle generally designated by the reference numeral 7. The vehicle 7 includes a main frame 8 having a pair of laterally spaced rails, one of which is indicated at 9, having an end surface 10 and disposed in forwardly extending relation to the forward portion of an operator's compartment 11, as defined by a control console 12. A frame extension 13 having a lower surface 14 is disposed in laterally inwardly offset extending relation to each of the rails 9 and is secured, as by welding, to the forward inner surface thereof. The vehicle is supported and propelled along the ground by a pair of track assemblies, one of which is shown at 15.

A power unit which includes an engine 16 and other power transmitting components such as a torque converter 17 is supported on the main frame 8 adjacent the forward end thereof. Engine 16 includes the normal forwardly mounted power accessories such as a fan 18, a water pump 19, and an alternator 20. The accessories are driven by the engine through any suitable drive means such as belts 21. A formed sheet metal hood 22 has a rear end 23 removably secured in any suitable manner to the control console 12. The hood extends forwardly from the control console in elevationally spaced covering relation to the engine 16 and terminates in a forward end 24.

The guard 6 includes an inverted generally U-shaped auxiliary or guard frame 25 having a generally horizontal transversely extending upper bight 26 connected at its opposite ends to a pair of depending legs 27. The legs extend downwardly therefrom in generally individual longitudinal alignment with the frame rails 9. Each leg 27 of the auxiliary frame includes a rearwardly directed mounting extension 28 adapted for individual pivotal connection to the frame extensions 13 by a pivot bolt 29. The mounting extension includes a rearwardly directed edge 28a disposed in spaced opposed relation to the end surface 10 of the frame rails 9. A plurality of attaching bolts 30 releasably secure the auxiliary frame in normally nonpivotal relation to the main frame during operation of the vehicle.

An elongated mounting member 31 extends laterally between the legs 27 in slightly spaced relation below the bight 26 of the auxiliary frame and is secured by any suitable manner such as by welding to the guard frame legs. Mounting member 31 includes a generally centrally disposed upturned connection portion 32 for purposes subsequently to be described. A pair of mounting brackets 33 are individually secured adjacent the lower end of each of the legs 27 and extend inwardly therefrom in opposed transversely spaced relation. The bight 26 of the auxiliary frame includes a rearwardly extending mounting flange 34. The forward end 24 of the hood 22 is disposed in overlapping relation to the mounting flange and is removably connected thereto by a plurality of capscrews 35. A lower guard member 36 is rigidly secured to and extends laterally between the lower ends of the legs 27. Such a guard assembly normally has an open front with a perforated or slotted guard plate, not shown, attached thereto to prevent the entry of large particles of debris or other foreign matter into the engine compartment of the vehicle.

A heat exchanger 37, which in this instance is depicted as a cooling radiator for the engine 16, is disposed in substantially upstanding relation between the guard 6 and the forward end of the engine. The heat exchanger includes a top tank 38, a bottom tank 39, and a central core 40 interposed in fluid transferring relation between the top and bottom tanks. The core is of the usual cellular type permitting flow of air therethrough to remove heat from fluid circulating through the heat exchanger. The top and bottom tanks include suitable connections 41 for establishing coolant fluid communication through a pair of hoses 42 between the heat exchanger and the engine. A filling spout 43 is provided in the top tank 38 for introduction of suitable coolant fluid to the heat exchanger.

In accordance with the principles of the present invention, the heat exchanger 37 is most advantageously removably supported within the auxiliary frame 25 for pivotal movement with the guard away from the forward end of the engine 16. In the specific embodiment shown, a resilient mount 44 is attached to the top tank 38 and is removably secured to the upturned connecting portion 32 of the mounting member 31 for support of the upper end of the heat exchanger. A pair of mounting brackets 45 are secured to the bottom tank 39 in laterally spaced relation for connection by a pair of resilient mounts 46 to the mounting brackets 33. This three point mounting system is effective to support the heat exchanger within the guard and to isolate the relatively delicate components of the heat exchanger from severe shocks during operation of the vehicle.

OPERATION

While the operation of the present invention is believed clearly apparent from the foregoing description, further amplification will subsequently be made in the following brief summary of such operation. With reference to FIG. 1, when it is desired to service the engine or forwardly mounted components thereon, as well as heat exchanger 37, the guard 6 and the heat exchanger mounted therein may be pivoted forwardly away from the front end of the engine. This is accomplished by taking off the engine hood 22 upon removal of the capscrews 35 and disconnection of the fluid coolant hoses 42 from the heat exchanger. The attaching bolts 30 are then removed and the pivot bolt 29 is loosened sufficiently to permit the guard to be swung forwardly to provide access to the forward portion of the engine and the heat exchanger.

The amount the guard 6 may be pivoted forwardly may be limited in any suitable manner. In the particular arrangement illustrated, the pivotal movement of the guard is limited by engagement of the lower guard member 36 with the lower surface 14 of the frame extension 13. An alternate arrangement would be to provide a cam stop, not shown, between the rearward edge 28a of mounting extension 28 and the forward end surface 10 of the frame rails. The degree to which the guard may be tilted is readily adjusted by the relative points of contact between the stop surfaces.

When servicing of the engine or heat exchanger is completed, the guard is returned upwardly rearwardly to the position illustrated in FIG. 1, the attaching bolts 30 reinstalled and the pivot bolt 29 retightened. The hood 22 is then replaced and the capscrews 35 reinstalled to restore the tractor to an operating condition.

SECOND FORM

Figure 10:
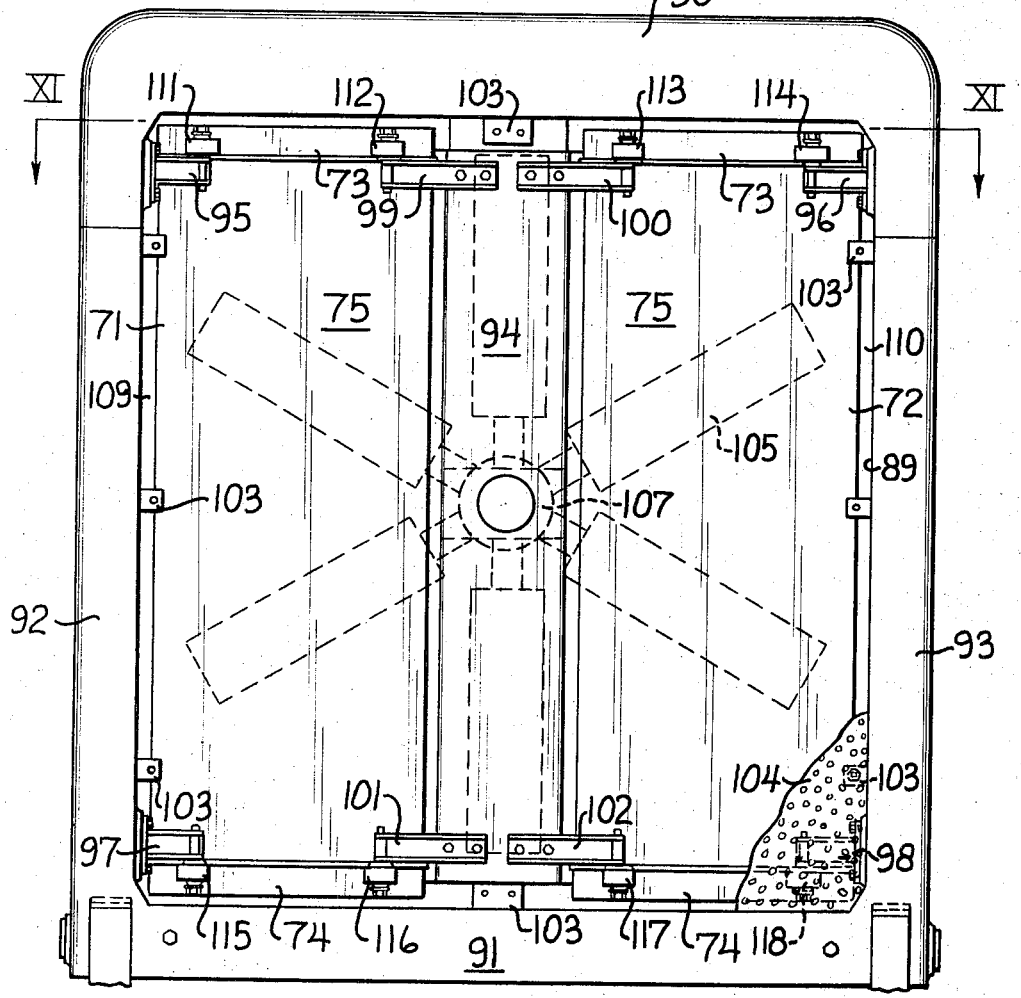
FIG. 10 is a front view of the improved pivotal guard with portions broken away to disclose the heat exchanger mounting therein.

An alternate embodiment of a pivotal guard embodying the principles of the present invention is shown in FIGS. 6 through 11 and is generally indicated by the reference numeral 47 operatively associated with a tractor designated by the reference numeral 48. In this embodiment, the tractor includes a main frame 49 having a rear portion 50 for support of an operator station generally indicated at 51 as partially defined by a control console 52. The main frame further includes a pair of laterally spaced forwardly extending rails 53 which partially define an engine compartment 54. An engine 55 is disposed in the engine compartment and is supported at its forward end with respect to the frame rails 53 by a front engine support bracket 56.

The tractor 48 is supported and propelled by a pair of elongated track assemblies, one of which is shown at 57, which are individually laterally disposed on opposite sides of the tractor. Each track assembly includes a track frame 58 having opposite ends which individually rotatably support a pair of spaced idlers 59 about which an endless track chain 60 is trained for circuitous movement. A drive sprocket 61 drivingly engages the track chain and is powered by the engine 55 through a drive train indicated generally at 62. The drive train may be of any suitable type such as that illustrated including a torque converter 63 and a transmission 64. The engine, the torque converter, and the transmission make up a total heat generating power unit for driving of the tractor.

Since the engine 55, the torque converter 63, and transmission 64 all produce heat in the generation of and transfer of power, it is necessary that it be dissipated to avoid overheating and consequent damage to such vehicle components. For this purpose, a heat exchanger 65 is operatively associated with the engine for circulation of coolant fluid therethrough in order to permit ready dissipation of heat therefrom. The heat exchanger consists of a tank top 66, a bottom tank 67, and a core 68. The core is of the usual cellular type through which cooling air is permitted to pass. The lower end of the heat exchanger is supported by means of a pair of brackets, one of which is shown at 69, and which are removably secured to the front engine support bracket 56. The upper end of the heat exchanger is connected to a tower 70 which is also removably secured to the engine support bracket.

A pair of heat exchangers 71 and 72 are operatively associated with the power transmitting element 63 and 64 of the power unit for dissipation of heat from the lubricating and actuating fluid therein. The heat exchangers 71 and 72 individually include a top tank 73, a bottom tank 74 and a core 75. The cores are of the usual cellular type permitting flow of air therethrough to remove heat from the fluid circulated through the heat exchanger. Suitable fluid connections, not shown, are provided between the heat exchangers and the transmission and torque converter for circulation of the lubricating and actuating fluid through the heat exchangers.

A bulldozer blade 76 is positioned forwardly of the tractor 48 and extends laterally thereof for moving earth ahead of the vehicle. A pair of push arms, one of which is shown at 77, are individually disposed at opposite sides of the tractor and are individually pivotally connected at their forward ends to one of a pair of brackets 78 secured in transversely spaced relation to the rear lower face of the bulldozer blade. The rearward ends of the push arms are individually pivotally connected at 79 to their respectively adjacent track frames 58. The blade 76 is held in a substantially vertical position by a pair of braces, one of which is shown at 80, and which are individually pivotally connected to a bracket 81 on each of the push arms and by a ball and socket connection 82 to the upper rear face of the blade. A pair of lift jacks, one of which is shown at 83, are individually pivotally supported at opposite sides of the guard 47 by a yoke 84 and extend downwardly where a terminal end of a piston rod 85 is pivotally connected to the rear face of the blade. Extension and retraction of the jacks 83 under suitable control of the operator is effective to raise and lower the bulldozer blade.

The pivotal guard 47 is disposed adjacent the forward end of the vehicle and is pivotally supported on the forward end of the main frame 49 by a pivot 86 and is separately, releasably and nonrotatably connected to the main frame by a pin connection 87. The guard 47 includes an auxiliary or guard frame 88 of generally rectangular construction having an opening 89 defined by an upper cross member 90 and a lower cross member 91, which are interconnected at their opposite ends by a pair of generally upstanding side panels 92 and 93. The guard further includes a centrally located substantially vertically disposed support member 94 having its upper and lower ends securely attached to the upper cross member 90 and lower cross member 91, respectively. A pair of upper outer mounting brackets 95 and 96 are individually removably secured in inwardly extending relation to the inner surface of the side panels 92 and 93, respectively, adjacent the upper end thereof. A pair of outer lower mounting brackets 97 and 98 are individually removably secured in inwardly extending relation to the inner surface of side panels 92 and 93, respectively, adjacent the lower ends thereof. A pair of upper inner mounting brackets 99 and 100 are individually secured in oppositely outwardly extending relation to the centrally disposed support member 94 adjacent to its upper end. A pair of lower inner mounting brackets 101 and 102 are individually secured in oppositely outwardly extending relation to the support member 94 adjacent to its lower end. A plurality of grill brackets 103 are provided in spaced relation around the periphery of opening 89 for attachment of a perforated wall or protective grill, a portion of which is illustrated at 104.

An engine cooling fan 105 is removably secured to a generally U-shaped bracket 106 which in turn is removably secured to the support member 94 intermediate its ends. A hydraulic motor 107 is provided for driving of the fan 105 with the motor being removably attached to the bracket 106 by a plurality of capscrews 108. The motor 107 may be provided with any suitable fluid communication to an engine driven pump, not shown, for driving the fan to pull air through the cores 75 of the heat exchangers 71 and 72.

The central location of support member 94 within the opening 89 divides that opening into two generally rectangular openings 109 and 110 oppositely and equally spaced to either side of the longitudinal center line of the vehicle. The previously described heat exchangers 71 and 72 are individually disposed in substantially vertical laterally spaced coplanar relation within the openings 109 and 110, respectively. A pair of upper brackets 110 and 112, respectively, are secured in laterally spaced relation to the top tank 73 of the heat exchanger 71 with a similar pair of upper brackets 113 and 114 secured in laterally spaced relation to the top tank 73 of the heat exchanger 72. Similar pairs of lower brackets 115 and 116 and 117 and 118 are secured to the bottom tanks 74 of the heat exchangers 71 and 72, respectively, in substantially vertical alignment with the inner and outer brackets 111 and 112 and 113 and 114, respectively. The upper brackets 111, 112, 113 and 114 are individually pivotally secured to the upper mounting brackets 95, 99, 100 and 96, respectively. The lower brackets 115, 116, 117 and 118 are individually pivotally secured to lower mounting brackets 97, 101, 102 and 98, respectively. The above described pivotal mounting connections of the heat exchangers 71 and 72 to the guard 47 preferably include resilient means to protect the heat exchangers from shock and possible damage during operation of the vehicle.

As best shown in FIG. 9, the pivotal connections 86 between the guard 47 and the main frame 49 individually include a bracket 119 secured adjacent the forward end of each of the frame rails 53. Each bracket mates with one of a pair of slots 120 provided in the outer lower corners of the auxiliary frame 88. Brackets 119 individually include a bore 121 which in the installed position are individually aligned with one of a pair of aligned bores 122 each extending transversely of one of the slots 120 in the auxiliary frame for individual reception of one of a pair of pivot pins 123. The pivot pins are each retained in their described positions by one of a pair of bolts 124 which extends through suitably aligned holes in the guard 47 and the inner end of the pivot pins.

The pin connections 87 disposed adjacent the rearward edge of guard 47 are identical and individually include a bifurcated bracket 125 welded to the top surface of one of the frame rails 53. Each bracket has a slot 126 substantially vertically disposed therein for reception of an attaching bracket 127 suitably secured adjacent the rear edge of the guard. A pin 128 extends through aligned bores 129 and 130 in the brackets 125 and 127, respectively, when the guard is in the installed locked position. The pin 128 is retained in the bores by a laterally extending bolt 131 which is inserted through aligned holes in the bracket 125 and the pin 128.

An engine compartment hood 132 is disposed in protective overlying relation to the engine compartment 54 and is removably secured to the control console 52 and the auxiliary frame 88 by a plurality of capscrews 133 and 134, respectively.

OPERATION OF SECOND FORM

Referring now to FIG. 6, the guard 47 may be pivoted forwardly to provide access to the forward portion of the engine compartment and the heat exchanger 65. This is accomplished by removal of the engine hood 132 and the pins 128 of the pin connections 87. Since the yoke 84 supporting the lift jack 83 is pivotally connected to the auxiliary frame 88, the guard may be rotated forwardly by manipulation of the operator's control, not shown, to retract the lift jack. Since the line of force between the mounting of the yoke 84 and the pivotal connection of the piston rod 85 to the blade 76 is forwardly of the pivot 86, such retraction of the jack rotates the guard 47 forwardly to any desired position short of interference between the guard and the blade 76. This provides free access to the engine and any forwardly mounted components thereon as well as the heat exchanger 65 so that service thereon may be readily performed. When the servicing of the machine is completed, the guard may be returned to the position illustrated in FIG. 1 by extension of the lift jack 83. The pins 128 are then reinstalled in the pin connections 87 to lock the guard with respect to the main frame 49.

It is also necessary to have access to the heat exchangers 71 and 72 for service or cleaning thereof as well as to the engine cooling fan 105. Another important aspect of this invention is the mounting of the heat exchangers 71 and 72 in a manner to permit pivotal movement thereof with respect to the auxiliary frame 88 to facilitate such service or cleaning. This is accomplished by removal of the grill 104 and disconnection of the brackets 99 and 101 and 100 and 102 from the central support member 94. This allows the heat exchanger 71 to be pivoted outwardly about the pivotal connection between the outer mounting brackets 95 and 97 and the brackets 111 and 115, respectively, whereas the heat exchanger 72 may be similarly pivoted outwardly about the pivotal connection formed by the brackets 96, 114 and 98, 118. In addition, the heat exchangers can be readily removed for complete replacement or major servicing by disconnecting the brackets 95, 96, 97 and 98 from the side panels 92 and 93 of the auxiliary frame 88. The heat exchangers may be returned to their operative position by pivotally swinging the heat exchangers about the pivotal connection between the outer brackets and reattachment of the inner brackets to the central support member.

In view of the foregoing, it is readily apparent that the structure of the present invention provides an improved pivotal engine guard and heat exchanger mounting which provides free access to the engine compartment and the heat exchangers for field servicing or cleaning thereof. This minimizes down time for the vehicle for such servicing and thereby provides for a much more efficient vehicle operation. The mounting of one or more of the heat exchangers in the pivotal guard for pivotal movement away from the forward end of the power unit permits expeditious servicing of the engine and related components and accessories in many instances without requiring removal of any of the somewhat heavy and cumbersome heat exchangers.

While the invention has been described and shown with particular reference to the preferred embodiments, it will be apparent that variations might be possible that would fall within the scope of the present invention which is not intended to be limited except as defined in the following claims.

What is claimed is:

1. A pivotal guard, for a vehicle having a longitudinal axis and providing a main frame with a heat generating power unit supported thereon, comprising;

heat exchanger means operatively associated with said power unit for dissipating heat therefrom;

a generally upstanding auxiliary frame having a lower end and removable front wall disposed in spaced shielding relation to such a power unit;

pivot means pivotally connecting the lower end of said auxiliary frame to such a main frame;

fastening means spaced from said pivot means for releasably connecting said auxiliary frame to said main frame; and mounting means for removably and pivotally securing said heat exchanger means in said auxiliary frame intermediate said front wall and said power unit so that release of said fastening means permits swinging of said guard and said heat exchanger means as a unit forwardly and downwardly away from said power unit about said pivot means to provide service access to said power unit and said heat exchanger means and removal of said front wall permits swinging of said heat exchanger means relative to said auxiliary frame to a position additionally independently facilitating service access and cleaning of said heat exchanger means.

2. The pivotal guard of claim 1 wherein said heat exchanger means comprises a pair of heat exchangers each individually pivotally supported on said auxiliary frame for selective swinging movement relative thereto.

3. The pivotal guard of claim 2 wherein said paor of heat exchangers are of the liquid to air type juxtapositioned in substantially coplanar relation to provide spaced substantially parallel air flow paths therethrough.

4. The pivotal guard of claim 3 including a cooling fan having driving connection with the power unit and means rotatably supporting said fan in said auxiliary frame between said heat exchangers and said power unit for selectively inducing flow of air through said heat exchangers.

5. The pivotal guard of claim 4 wherein said pair of heat exchangers are disposed in spaced side-by-side relation and are individually and substantially symmetrically disposed on opposite sides of such longitudinal axis of the vehicle.

6. The pivotal guard of claim 5 wherein said auxiliary frame comprises elevationally spaced upper and lower cross members extending transversely of the longitudinal axis, and a pair of laterally spaced generally upright side members individually disposed in interconnecting relation between said upper and lower cross members to provide a substantially rectangular structure defining a relatively large unrestricted opening therethrough.

7. The pivotal guard of claim 6 wherein said auxiliary frame includes an elongated support strut substantially centrally disposed intermediate said side members and having upper and lower ends individually and respectively connected to said upper and lower cross members, said support strut being substantially disposed between and laterally coextensive with said heat exchangers, and said mounting means includes bracket means removably securing each of said heat exchangers to said support strut.

8. The pivotal guard of claim 7 wherein said cooling fan is rotatably associated with a driving motor and said driving motor is removably secured to said support strut for selectively inducing said flow of air through said heat exchangers.

9. A power unit guard and cooling system for a vehicle having a longitudinally extending main frame supporting a power unit thereon, comprising;
   a guard frame having upper and lower ends and a front grill disposed in longitudinally spaced relation to the power unit;
   pivot means pivotally connecting the lower end of said guard frame to such a main frame for selective pivotal movement of said guard frame forwardly and downwardly away from the power unit;
   fastening means longitudinally rearwardly spaced from said pivot means for releasably connecting said guard frame to the main frame;
   a first heat exchanger removably mounted on the main frame and having operative connection with the power unit for dissipation of heat therefrom;
   a pair of second heat exchangers operatively connected with the power unit for dissipation of heat from a portion thereof and individually disposed in substantially upstanding equally laterally spaced coplanar relation on opposite sides of a central longitudinal axis of the vehicle; and
   means individually pivotally mounting said second heat exchangers in said guard frame intermediate said front grill and said first heat exchanger for selective swinging movement relative thereto independently of the release of said fastening means to permit swinging of said power unit guard and said second heat exchangers as a unit away from the power unit and from said first heat exchanger to provide service access thereto.

10. The power unit guard and cooling system of claim 9 wherein said guard frame comprises elevationally spaced upper and lower cross members extending transversely of the longitudinal axis, and a pair of laterally spaced generally upright side panels individually disposed in interconnecting relation between said upper and lower cross members to provide a substantially rectangular structure defining a relatively large unrestricted opening therethrough.

11. A power unit guard and cooling system for a vehicle having a longitudinally extending main frame supporting a power unit thereon comprising;
   a guard frame including elevationally spaced upper and lower cross members extending transversely of the longitudinal axis, a pair of laterally spaced generally upright side panels individually disposed in interconnecting relation between said upper and lower cross members to provide a substantially rectangular structure defining a relatively large opening therethrough, a front grill disposed in longitudinally spaced relation to said power unit, and an elongated support strut substantially centrally disposed intermediate said side panels and having upper and lower ends individually and respectively connected to said upper and lower cross members;

pivot means pivotally connecting said side panels to said main frame for selective pivotal movement of said guard frame forwardly and downwardly away from said power unit;
   fastening means longitudinally rearwardly spaced from said pivot means for releasably connecting said guard frame to said main frame;
   a first heat exchanger removably mounted on said main frame and having operative connection with said power unit for dissipation of heat therefrom;
   a pair of second heat exchangers individually disposed in substantially upstanding equally laterally spaced coplanar relation on opposite sides of said support strut to provide spaced substantially parallel air flow paths therethrough, and wherein said second heat exchangers are individually pivotally supported on said guard frame for selective swinging movement relative thereto; and
   mounting means for removably securing said pair of second heat exchangers in said guard frame intermediate said front grill and said first heat exchanger and including bracket means individually removably securing each of said pair of second heat exchangers to laterally opposite sides of said support strut.

12. The power unit guard and cooling system of claim 11 wherein a cooling fan having driving connection with the power unit is rotatably and removably supported on said support strut intermediate said first and second heat exchanger means for selectively inducing flow of air through said heat exchangers.

13. The power unit guard and cooling system of claim 12 wherein the vehicle comprises a crawler type vehicle having a pair of track assemblies individually disposed in substantially parallel alignment on opposite sides of the vehicle and having driving connection with the power unit.

14. The power unit guard and cooling system of claim 13 wherein the power unit comprises an engine for generating power and a power transmission for transmitting such power to said track assemblies for propelling the vehicle.

15. A pivotal guard, for a vehicle having a main frame with a heat generating power unit supported thereon and a heat exchanger operatively associated therewith, comprising;
   a generally upstanding inverted U-shaped auxiliary frame including a pair of laterally spaced depending side panels;
   pivot means pivotally connecting said side panels of said auxiliary frame to such a main frame;
   fastening means for releasably connecting said auxiliary frame to said main frame;
   mounting means for removably securing said heat exchanger protectingly within said auxiliary frame; and
   positive stop means integrally associated with said auxiliary frame and disposed thereon so that upon release of said fastening means said auxiliary frame and said heat exchanger are permitted unrestricted swinging movement as a unit about said pivot means forwardly and downwardly away from said power unit to a position wherein said stop means contacts said main frame in supporting relation to provide safe service access to said heat exchanger and said power unit.

16. The pivotal guard of claim 15 wherein said positive stop means is an elongated plate providing a lower guard disposed in transversely extending rigidly interconnecting relation between the lower ends of said side panels in shielding protecting relation beneath said heat exchanger.

17. The pivotal guard of claim 16 wherein said main frame includes a pair of laterally spaced rails individually having a forwardly disposed lower end surface thereon and said elongated plate has a rearwardly facing edge thereon so that said auxiliary frame and said heat exchanger are permitted to tilt until said rearwardly facing edge of said elongated plate abuts said end surfaces of said rails.

* * * * *